No. 633,688. Patented Sept. 26, 1899.
J. DELATTRE.
APPARATUS FOR PURIFYING WASHWATERS FROM WOOL.
(Application filed Dec. 14, 1897.)
(No Model.) 2 Sheets—Sheet 1.
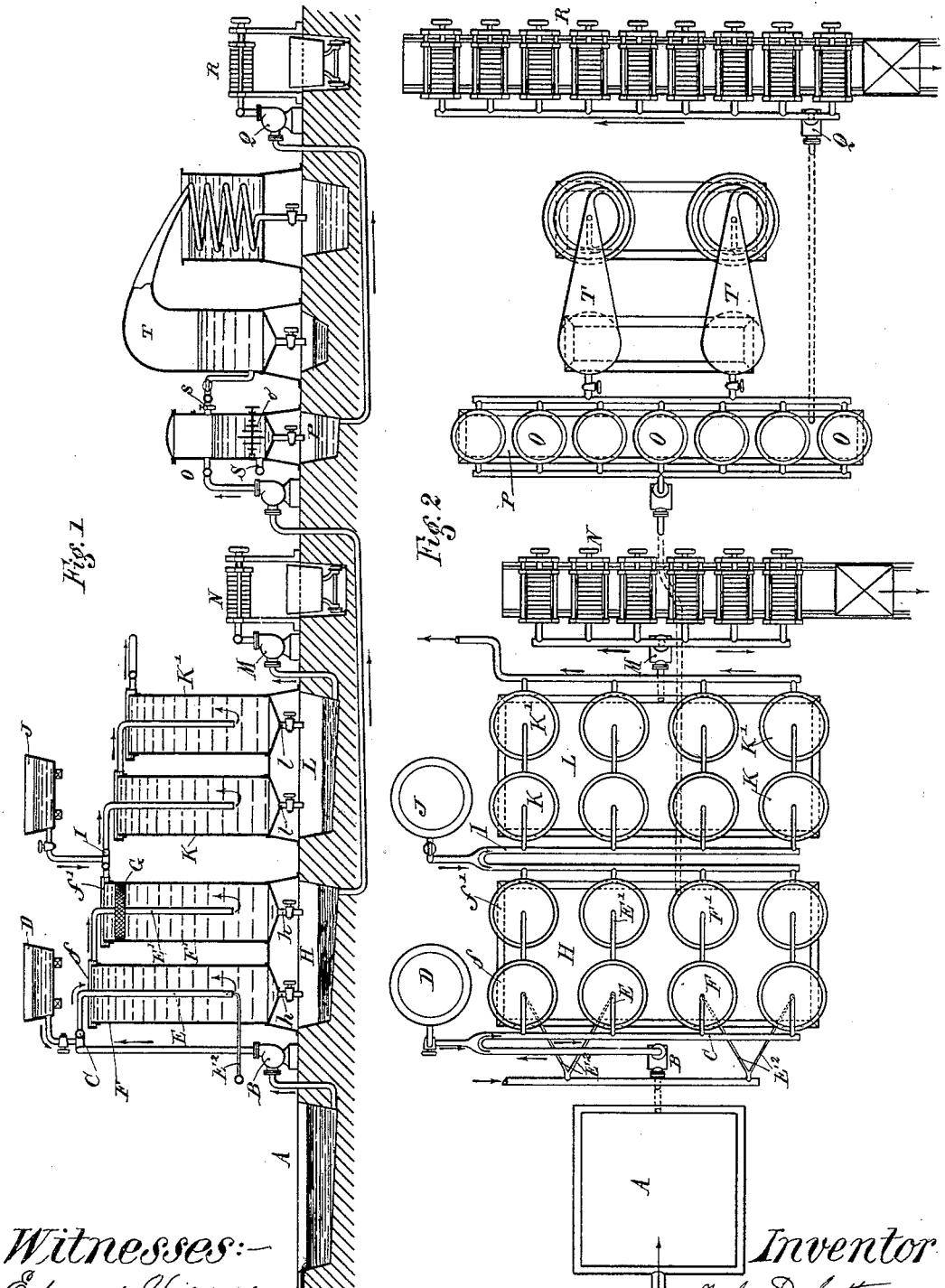
Witnesses:—
Edward Vieser
George Barry Jr.
Inventor
Jules Delattre
By attorneys
Brown & Seward

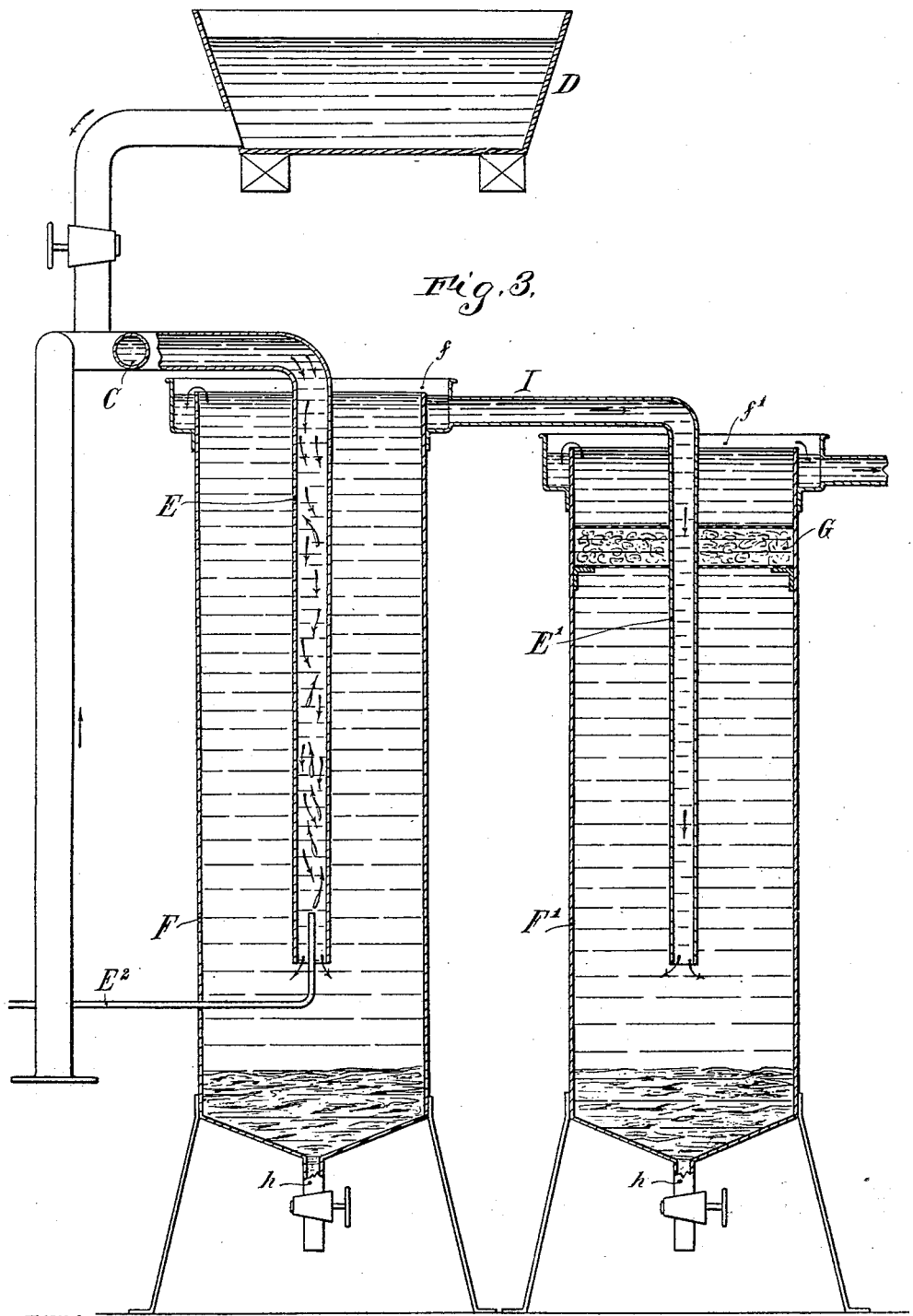

UNITED STATES PATENT OFFICE.

JULES DELATTRE, OF DORIGNIES, FRANCE.

APPARATUS FOR PURIFYING WASHWATERS FROM WOOL.

SPECIFICATION forming part of Letters Patent No. 633,688, dated September 26, 1899.

Application filed December 14, 1897. Serial No. 661,790. (No model.)

*To all whom it may concern:*

Be it known that I, JULES DELATTRE, of Dorignies, in the Republic of France, have invented a new and useful Improvement in Apparatus for the Purification of Foul Waters from the Washing of Wools, with Recovery of By-Products, of which the following is a specification.

My improvement consists in a combination of apparatus constituting an installation which effects the purification under conditions such that on one part the waters will be rendered inoffensive and may be run off without inconvenience into rivers and that on the other hand the whole of the fatty matters contained in the foul waters may be recovered, while the solid residue is brought to a state of cakes, which constitutes an excellent manure.

The process of treatment which I have effected by means of my new installation is the following: The foul waters are first treated with sulfuric acid under such conditions that they precipitate an abundant deposit containing the fatty matters and the impurities. This deposit in the state of slime is treated by a solvent of fatty matters which carries off the latter, which are afterward separated by distillation. The slimes with the fatty matters removed which remain are treated in a filter-press, and thus form cakes, which are employed as manure. With regard to the waters acidified and separated from the deposit by decantation, these are neutralized by lime under such conditions that a second deposit is precipitated, which is treated in a filter-press, and thus brought to the state of cakes, which constitute a manure. The waters separated from the second deposit by decantation and which are neutral or slightly alkaline are thus completely purified and made without inconvenience to be run into the river.

The installation which I have devised for carrying out this method of treatment in the most favorable manner, both from the technical point of view and from the economical point of view, combines certain conditions which will be indicated hereinafter and owing to which this installation allows the treatment to be effected with great rapidity in a limited space and at the smallest expense, generally without any expense at all and often even with benefit. These conditions are the following:

First. The foul waters are taken and treated as they are produced, and the duration of their treatment does not exceed from five to six hours. With regard to the precipitates they are at once treated so as to extract the fats and the manure therefrom. The result is that neither the waters under treatment nor the precipitated matters have time to decompose, thus avoiding a number of inconveniences, notably the nauseous odor of decomposing organic matters, while at the same time the value of the fats and of the manures extracted from the precipitates is considerably increased. Further, the installation occupies considerably much less space than when on account of the long duration of the treatment there is necessarily an accumulation of large masses of water and of precipitates.

Second. The application of the acid employed for producing the formation of the fatty precipitates and the application of the lime employed for neutralizing the decanted waters can be very easily effected. Further, the waters are treated by these reagents under conditions such that the maximum utilization of the latter is secured. The result is a large economy in the treatment and the obtaining of purified waters, which must not be either acid nor too stronly alkaline when they are discharged into the river. They are therefore at this moment absolutely inoffensive, which is a very essential condition.

Third. The direct and immediate extraction by a solvent of the fatty matters contained in the deposits produced by the acidification enables a very rapid and complete removal of the fats to be economically obtained. It avoids the passage to the filter-presses of fatty matters, which are filtered and compressed with difficulty.

In the accompanying drawings, Figure 1 represents the complete installation in vertical section; Fig 2, a plan of the same. Fig. 3 represents a vertical section, on a larger scale, of a decanting-receptacle and its appurtenances, which constitute important features of my invention.

The foul waters resulting from the washing of wools are conveyed into a receptacle A, which forms a water-reservoir—that is to say, which stores up the waters when they arrive in excess, so that the operation of the installation may be always very regular, in spite of the very great variations in the arrival of the foul waters to be treated. A pump B, the suction-tube of which opens into the bottom of the reservoir A, draws in from this reservoir both the water and the materials which have a tendency to become deposited and forces them into a distributing-conduit C, where they become mixed with a thin current of sulfuric acid proceeding from an upper reservoir D. The waters thus acidified descend through the vertical tubes E, arranged in the centers of a series of decanting-receptacles F and terminating at one or two meters from the bottom of these receptacles. In each of the tubes E a mixer is preferably arranged which serves to effect the intimate admixture of the water with the acid. This mixture may be a mechanical one, or the intimate admixture may be effected by forcing air into the tube E by means of an air-supply pipe $E^2$, which opens into the lower part of this tube. The air thus forced into the tube E descends at first therein with some rapidity; but it gradually loses its speed and finally returns toward the bottom of the said tube with the descending water and escapes with the water from the bottom of said tube into the receptacle F. If the pressure of the air thus forced in is too strong, a portion of it may be wasted by escaping through the acid-reservoir D. The water which passes out from the bottom of the tube E ascends into the decanting-receptacle around this tube at a very slow rate, seeing that the section of the decanting-receptacle is much greater than that of the tube. Owing to the slowness of this upward movement the impurities in suspension and the matters which have been rendered insoluble by the acid are precipitated at the bottom of the decanting-receptacle with the fatty matters liberated by the acid, the latter matters being carried down with the impurities which are heavier than water. The acidulated water overflows from the top of the decanting-receptacle into an annular distributer $f$, which surrounds the said receptacle, whence the overflow proceeds by a pipe $i$ (see Fig. 3) to the central tube E' of a second decanting-receptacle F', and so on, the number of the decanting-receptacles placed one after the other being smaller or greater according to requirements. Owing to the slow speed of the ascending current in the decanting-receptacles, as hereinbefore described, there results a filtration, which is completed in the last decanting-receptacle by means of a suitable filter G, placed in the upper part of the receptacle around its central tube. The said filter is represented in Fig. 3 as composed of two perforated plates having wood-shavings packed between them.

As the water passes successively through several decanting-receptacles F F' and the degree of acidity at its outflow from each of them can be readily ascertained, if necessary a further quantity of acid may be added at its exit from one of the decanting-receptacles and before its admission into the following one, so as to with certainty effect—and this without adding a large excess of acid—the necessary acidification for the total decomposition. The waters which leave the last decanting-receptacles F' are therefore only slightly acid. They have given up the whole of their fat in the decanting-receptacles and this in a very short space of time.

After its exit from the last acid-decanting receptacle the water passes to a distributing-conduit I, where it is mixed with a current of milk of lime proceeding from an upper reservoir J. The water, with the lime added, then proceeds to decanting-receptacles K K', similar to the former, where by successive decantations they are brought to a complete state of purification before finally escaping in a neutral or slightly-alkaline state. The addition of lime is naturally regulated in the same manner as the addition of the acid. It may be observed that this addition of lime will only be slight, as the acidification has been very correctly adjusted. The deposits formed by sulfate of lime and by the matters rendered insoluble by the lime are therefore small in the decanting-receptacles or neutralizing apparatus K K'. They are drawn off by the tube $l$, fitted with a cock, and are collected in a cistern L. Thence they are sent by a pump M to filter-presses N, where they are reduced to the state of dry cakes, which are in small quantity and form a but little cumbersome mass. They may be used as manure.

The fatty precipitates from the decanting-receptacles F F' or acidifying apparatus are much more abundant. They are drawn off by a tube $h$ with a cock and collected in a cistern H, thence they are sent in the form of slimes to an apparatus O, where the fats are at once methodically removed by a current of benzin or other solvent of fatty matters, such as sulfuret of carbon, alcohol, ether, &c. The result, therefore, is that in these apparatus the removal of the fats is effected on liquid slimes and not on fatty earths previously pressed and dried. A given number of cubic meters of slimes is conveyed successively to each of the apparatus O of which the extracting apparatus is composed, when by means of the tube S benzin already sufficiently charged with fat so that an emulsion may be formed under the action of the agitator $o$ with which it is provided is introduced. When this emulsion is formed, it is allowed to remain a few moments to enable the slimes to be attacked. Then benzin less charged with fat is injected and the operation continued thus and terminated with pure benzin, so as to methodically obtain a perfect removal of the fatty matters. When at the indicating-tap s, placed on the outlet for the benzin as it leaves the extractor, it is seen that there is no longer any fat, the supply of the benzin is stopped, the apparatus is emptied of benzin, and then the benzin with which the slimes are still impregnated is recovered by means of heat, during which the benzin is distilled until it is completely exhausted. When once all the benzin has been removed from the slimes, the latter are conveyed to a reservoir P, whence by means of force-pump Q they pass to the filter-presses R, where they form cakes. These cakes, containing from two to four per cent. of nitrogen according to the wools, constitute an excellent manure. The benzin saturated with fat is conveyed to a distilling apparatus T, where its separation from the recovered fatty matters is effected.

The above is in its entirety a description of the installation that I have devised for the purification of foul waters from the washing of wools. I do not lay stress upon the details of construction of the apparatus of which it is composed, for they may evidently be varied without departing from the spirit of my invention. Thus the acidifying or decanting apparatus may be either of round or square section. They may be constructed either of wood, stone, and even of sheet-iron, provided that they are interiorly covered with a coating which the acid will not attack, such as paint, enamel, lead, &c. The dimensions and the number of these apparatus, of the feed-pumps, &c., will evidently vary according to the size of the installation. The proportion of sulfuric acid to the water to be purified may be varied according to the nature and degree of impurity, and the proportion of lime to the acid should be such that the waters issuing from the last of the receptacles K' should be neutral or very slightly basic. The acid may be from 2.5 to 4 kilograms of a strength of 56° Baumé and the lime from 1 to 2.5 kilograms for every cubic meter of water.

Having thus described my invention, what I claim is—

1. For the purification of foul waters from the washing of wools, the combination of a reservoir for regulating the supply of the foul waters to be treated, of a series of acid-decanting receptacles, of a vertical tube placed in each receptacle and terminating at a certain distance above the bottom thereof, of means for conveying into the tube of the first receptacle the foul waters from the regulating-reservoir, of means for conveying into the tube of the following receptacles the waters which leave the upper part of the preceding receptacles in the series, of means for mixing acid to the foul waters before they enter into the decanting-receptacles, of a series of neutralizing decanting-receptacles, of a vertical tube placed in each of these receptacles and terminating at a certain distance above the bottom thereof, of means for conveying into the tube of the first neutralizing decanting-receptacle the waters leaving by the upper end of the last acid-decanting receptacle, of means for conveying into the tube of the following receptacles the waters which leave by the upper part of the preceding receptacles of the series, of means for mixing lime to the acid-waters before they enter into the neutralizing decanting-receptacles, of an extracting apparatus for the treatment by a suitable solvent of fatty slimes, deposited in the acid-decanting receptacles, of means for conveying the said slimes into this apparatus, and of a distilling apparatus for separating the solvent from the fatty matters with which it is charged.

2. For the purification of foul waters from the washing of wools, the combination of a reservoir for regulating the supply of the foul waters to be treated, of a series of acid-decanting receptacles, of a vertical tube placed in each receptacle and terminating at a certain distance above the bottom thereof, of means for conveying into the tube of the first receptacle the foul waters from the regulating-reservoir, of means for conveying into the tube of the following receptacles the waters which leave the upper part of the preceding receptacles in the series, of means for mixing acid to the foul waters before they enter into the decanting-receptacles, of a series of neutralizing decanting-receptacles, of a vertical tube placed in each of these receptacles and terminating at a certain distance above the bottom thereof, of means for conveying into the tube of the first neutralizing decanting-receptacle, the waters leaving by the upper end of the last acid-decanting receptacle, of means for conveying into the tube of the following receptacles the waters which leave by the upper part of the preceding receptacles of the series, of means for mixing lime to the acid-waters before they enter into the neutralizing decanting-receptacles, of means for agitating the waters in the vertical tubes of the decanting-receptacles, of an extracting apparatus for the treatment by a suitable solvent of fatty slimes, deposited in the acid-decanting receptacles, of means for conveying the said slimes into this apparatus, and of a distilling apparatus for separating the solvent from the fatty matters with which it is charged.

3. For the purification of foul waters from the washing of wools, the combination of a reservoir for regulating the supply of the foul waters to be treated, of a series of acid-decanting receptacles, of a vertical tube placed in each receptacle and terminating at a certain distance above the bottom thereof, of means for conveying into the tube of the first receptacle the foul waters from the regulating-reservoir, of means for conveying into the tube of the following receptacles the waters which leave the upper part of the preceding receptacles in the series, of means for mixing acid to the foul waters before they enter into the decanting-receptacles, of a series of neutralizing decanting-receptacles, of a vertical tube placed in each of these receptacles and terminating at a certain distance above the bottom thereof, of means for conveying into the tube of the first neutralizing decanting-receptacle the waters leaving by the upper end of the last acid-decanting receptacle, of means for conveying into the tube of the following receptacles the waters which leave by the upper part of the preceding receptacles of the series, of means for mixing lime to the acid-waters before they enter into the neutralizing decanting-receptacles, of tubes for the injection of air opening in the lower part of the vertical tubes of the decanting-receptacles, of an extracting apparatus for the treatment by a suitable solvent of fatty slimes, deposited in the acid-decanting receptacles, of means for conveying the said slimes into this apparatus, and of a distilling apparatus for separating the solvent from the fatty matters with which it is charged.

4. For the purification of foul waters from the washing of wools, the combination of a reservoir for regulating the supply of the foul waters to be treated, of a series of acid-decanting receptacles, of a vertical tube placed in each receptacle and terminating at a certain distance above the bottom thereof, of means for conveying into the tube of the first receptacle the foul waters from the regulating-reservoir, of means for conveying into the tube of the following receptacles the waters which leave the upper part of the preceding receptacles in the series, of means for mixing acid to the foul waters before they enter into the decanting-receptacles, of a series of neutralizing decanting-receptacles, of a vertical tube placed in each of these receptacles and terminating at a certain distance above the bottom thereof, of means for conveying into the tube of the first neutralizing decanting-receptacle the waters leaving by the upper end of the last acid-decanting receptacle, of means for conveying into the tube of the following receptacles the waters which leave by the upper part of the preceding receptacles of the series, of means for mixing lime to the acid-waters before they enter into the neutralizing decanting-receptacles of a filter at the exit of the last decanting-receptacle of a series, of an extracting apparatus for the treatment by a suitable solvent of fatty slimes, deposited in the acid-decanting receptacles, of means for conveying the said slimes into this apparatus, and of a distilling apparatus for separating the solvent from the fatty matters with which it is charged.

5. For the purification of foul waters from the washing of wools, the combination of a reservoir for regulating the supply of the foul waters to be treated, of a series of acid-decanting receptacles, of a vertical tube placed in each receptacle and terminating at a certain distance above the bottom thereof, of means for conveying into the tube of the first receptacle the foul waters from the regulating-reservoir, of means for conveying into the tube of the following receptacles the waters which leave the upper part of the preceding receptacles in the series, of means for mixing acid to the foul waters before they enter into the decanting-receptacles, of a series of neutralizing decanting-receptacles, of a vertical tube placed in each of these receptacles and terminating at a certain distance above the bottom thereof, of means for conveying into the tube of the first neutralizing decanting-receptacle the waters leaving by the upper end of the last acid-decanting receptacle, of means for conveying into the tube of the following receptacles the waters which leave by the upper part of the preceding receptacles of the series, of means for mixing lime to the acid-waters before they enter into the neutralizing decanting-receptacles, of an extracting apparatus composed of a series of receptacles provided with agitators for the treatment by a suitable solvent of the fatty slimes deposited in the acid-decanting receptacles, of means for conveying the said slimes into these receptacles, of means for causing to pass into these receptacles a liquid solvent, which is first charged with fat, then which becomes purer and purer, and of a distilling apparatus for separating the solvent from the fatty matters with which it is charged.

6. For the purification of foul waters from the washing of wools, the combination of a reservoir for regulating the supply of the foul waters to be treated, of a series of acid-decanting receptacles, of a vertical tube placed in each receptacle and terminating at a certain distance above the bottom thereof, of means for conveying into the tube of the first receptacle the foul waters from the regulating-reservoir, of means for conveying into the tube of the following receptacles the waters which leave the upper part of the preceding receptacles in the series, of means for mixing acid to the foul waters before they enter into the decanting-receptacles, of a series of neutralizing decanting-receptacles, of a vertical tube placed in each of these receptacles and terminating at a certain distance above the bottom thereof, of means for conveying into the tube of the first neutralizing decanting-receptacle the waters leaving by the upper end of the last acid-decanting receptacle, of means for conveying into the tube of the following receptacles the waters which leave by the upper part of the preceding receptacles of the series, of means for mixing lime in the acid-waters before they enter into the neutralizing decanting-receptacles of an extracting apparatus for the treatment by a suitable solvent of the fatty slimes deposited in the acid-decanting receptacles, of means for conveying the said slimes into this apparatus, of a distilling apparatus for separating the solvent from the fatty matters with which it is charged, of filter-presses for the treatment of the slimes from which the fats have been removed, and of means for conveying to these filter-presses the slimes which leave the extractor.

7. For the purification of foul waters from the washing of wools, the combination of a reservoir for regulating the supply of the foul waters to be treated, of a series of acid-decanting receptacles, of a vertical tube placed in each receptacle and terminating at a certain distance above the bottom thereof, of means for conveying into the tube of the first receptacle the foul waters from the regulating-reservoir, of means for conveying into the tube of the following receptacles the waters which leave the upper part of the preceding receptacles in the series, of means for mixing acid to the foul waters before they enter into the decanting-receptacles, of a series of neutralizing decanting-receptacles, of a vertical tube placed in each of these receptacles and terminating at a certain distance above the bottom thereof, of means for conveying into the tube of the first neutralizing decanting-receptacle the waters leaving by the upper end of the last acid-decanting receptacle, of means for conveying into the tube of the following receptacles the waters which leave by the upper part of the preceding receptacles of the series, of means for mixing lime to the acid-waters before they enter into the neutralizing decanting-receptacles, of an extracting apparatus for the treatment by a suitable solvent of the fatty slimes deposited in the acid-decanting receptacles, of means for conveying the said slimes into this apparatus, of a distilling apparatus for separating the solvent from the fatty matters with which it is charged; of filter-presses for the treatment of the slimes deposited in the neutralizing decanting-receptacles, and of means for conveying the said slimes to these filter-presses.

8. For the purification of foul waters from the washing of wools, the combination of a reservoir for regulating the supply of the foul waters to be treated, of a series of acid-decanting receptacles, of a vertical tube placed in each receptacle and terminating at a certain distance above the bottom thereof, of means for conveying into the tube of the first receptacle the foul waters from the regulating-reservoir, of means for conveying into the tube of the following receptacles the waters which leave the upper part of the preceding receptacles in the series, of means for mixing acid to the foul waters before they enter into the decanting-receptacles, of a series of neutralizing decanting-receptacles, of a vertical tube placed in each of these receptacles and terminating at a certain distance above the bottom thereof, of means for conveying into the tube of the first neutralizing decanting-receptacle the waters leaving by the upper end of the last acid-decanting receptacle, of means for conveying into the tube of the following receptacles the waters which leave by the upper part of the preceding receptacles of the series, of means for mixing lime to the acid-waters before they enter into the neutralizing decanting-receptacles, of an extracting apparatus for the treatment by a suitable solvent of the fatty slimes deposited in the acid-decanting receptacles, of means for conveying the said slimes into this apparatus, of a distilling apparatus for separating the solvent from the fatty matters with which it is charged, of filter-presses for the treatment of the slimes from which the fats have been removed, of means for conveying to these filter-presses the slimes leaving the extractor, of other filter-presses for the treatment of the slimes deposited in the neutralizing decanting-receptacles, and of means for conveying the said slimes to these latter filter-presses.

In witness whereof I have hereunto set my hand in the presence of two subscribing witnesses.

JULES DELATTRE.

Witnesses:
 ALCIDE FABE,
 GEORGES CABARY.